(No Model.) 2 Sheets—Sheet 1.
L. C. MARTIN & J. G. MEREDITH.
ICE CREAM FREEZER.
No. 497,054. Patented May 9, 1893.
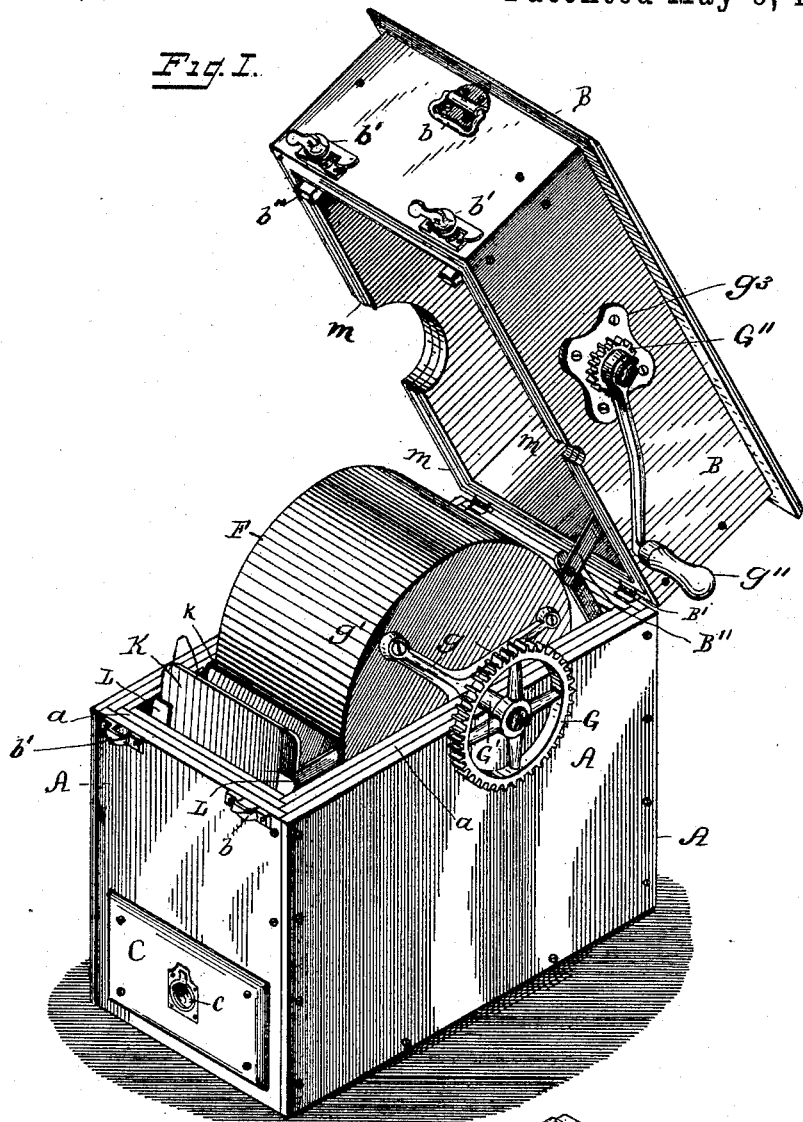
Fig. I.
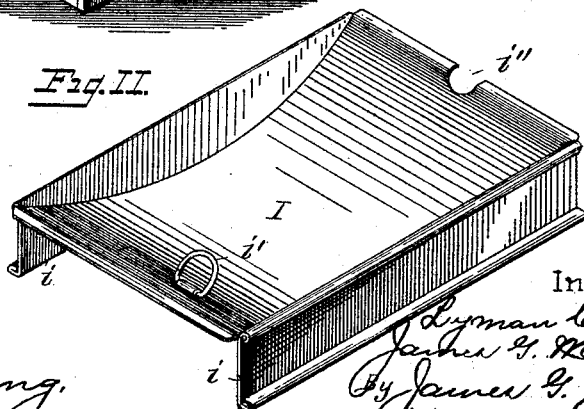
Fig. II.
Witnesses:— Inventors—
R. A. Balderson. Lyman C. Martin
Bessie E. Young. James G. Meredith
By James G. Young
Their Attorney (No Model.) 2 Sheets—Sheet 2.
L. C. MARTIN & J. G. MEREDITH.
ICE CREAM FREEZER.
No. 497,054. Patented May 9, 1893.
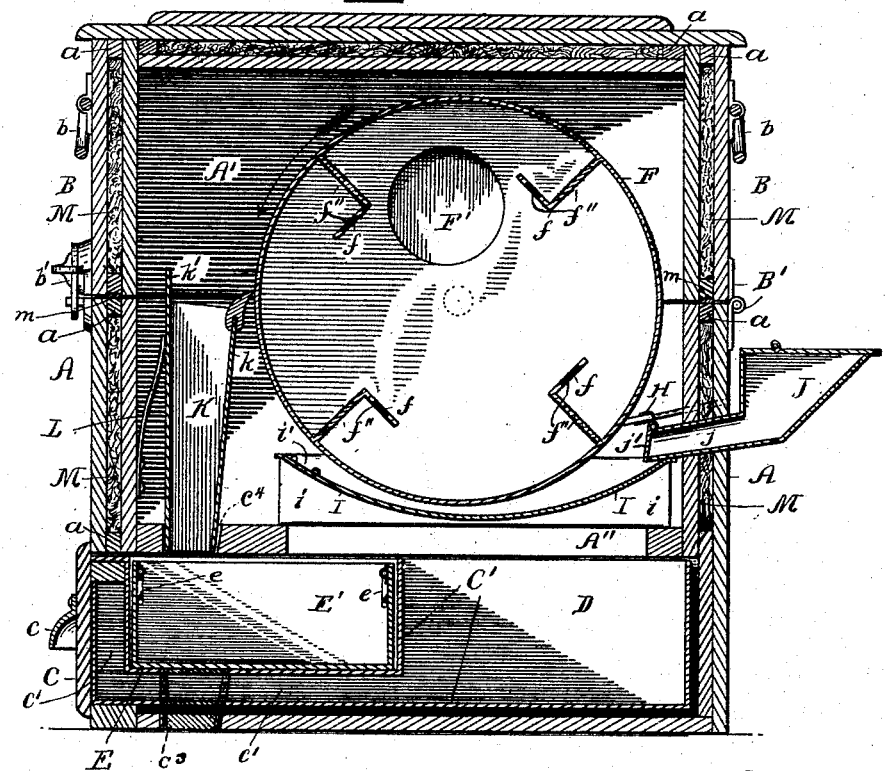
Fig. III.
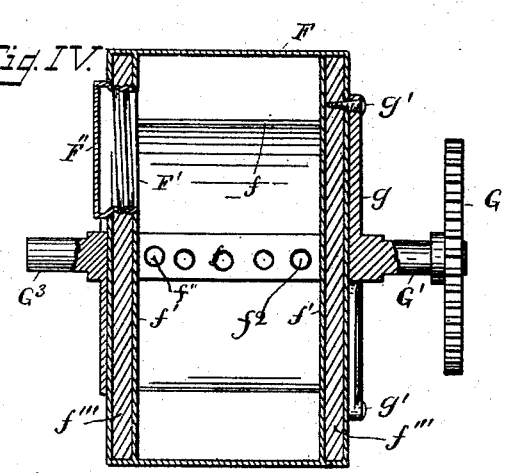
Fig. IV.
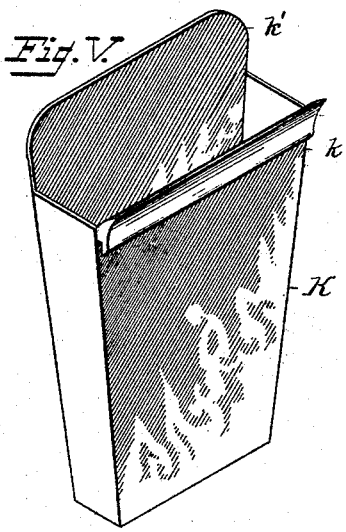
Fig. V.
Witnesses
Jas. K. Lathy
R. A. Balderson
Inventors.
L. C. Martin
J. G. Meredith

UNITED STATES PATENT OFFICE.

LYMAN C. MARTIN AND JAMES G. MEREDITH, OF KANSAS CITY, MISSOURI.

ICE-CREAM FREEZER.

SPECIFICATION forming part of Letters Patent No. 497,054, dated May 9, 1893.

Application filed April 25, 1891. Serial No. 390,496. (No model.)

*To all whom it may concern:*

Be it known that we, LYMAN C. MARTIN and JAMES G. MEREDITH, citizens of the United States, residing at Kansas City, in the county of Jackson and State of Missouri, have invented certain new and useful Improvements in Ice-Cream Freezers and Refrigerators; and we do declare the following to be a full, clear, and exact description of the invention, such as will enable others skilled in the art to which it appertains to make and use the same, reference being had to the accompanying drawings, and to the letters of reference marked thereon, which form a part of this specification.

The object of our invention, is to provide an ice cream freezer and refrigerator, in which the freezer shall have the greatest length of freezing surface practicable from the point of contact with the cream until the point of leaving the cylinder, where it is removed by the scraper including a storage or refrigerating chamber for prepared ice cream, for preserving it in its frozen condition until removed for use.

A further object of our invention is to secure not only an air tight chamber surrounding the freezing cylinder, but to continue the air-tight and refrigerating principle during and after the scraping of the cream from the cylinder and while it is stored in the receiving pans until removed for use.

Figure I, is a perspective view of our ice cream freezer, with the cover partly raised, showing some of the improvements. Fig. II, is a detail view in perspective of the cream pan under the cylinder, and from which the cylinder in its revolutions takes the cream distributed on its surface, and freezing it, carries it over until it reaches the point in contact with the scraper. Fig. III, is a cross sectional view of the freezer, showing the improvements and constructions of the same. Fig. IV, is a sectional view in detail of the freezing cylinder, including the holding cups for resisting any movements of the ice in the cylinder, different from the normal revolution of the cylinder, also showing the gear wheel by which the same is operated on one side, with the receiving neck on the other. Fig. V, is a detail view in perspective of the combined scraper and conduit, showing a short side with a scraper attached thereto, and a longer side extending above the point of scraping, used as a guard to prevent the cream during the process of scraping from being thrown over the opposite side of the conduit from the scraping edge.

Similar letters refer to similar parts throughout the several views.

A, represents the refrigerator box, constructed of wood or metal; preferably of two walls, inclosing packing chambers, which are to be provided with a fabric or plastic packing M' or left open as may be desired.

$a$, are suitable cleats connecting the outer and inner walls, thus forming the chambers and securing the packing in same.

A' is the freezing chamber, in which are secured the freezing cylinder, scraper and conduit and the pan, which will be referred to hereinafter.

B, is the cover forming part of box A, and is operated on suitable hinges B'; and locked down to the main box A, by a locking device $b'$.

B'', is a hinged brace which holds the cover in position when open and prevents it from being thrown back too far.

To assist in transporting and lifting the freezer around handles $b$ are provided and secured on the front and rear of cover B. $b''$, are lugs which assist in holding said cover in position and prevent any lateral motion.

C, is a drawer constructed substantially as shown in Fig. III, having a metallic lining C'. This drawer is divided into two apartments, D, and E; the rear apartment D is designed to be filled with broken ice and salt as a refrigerating medium for the frozen cream contained in the front apartment E; said ice and salt will also assist in freezing the liquid cream contained in pan I. The apartment E, is surrounded on the front and sides by cold air chamber $c'$, which by reason of the ice and salt contained in apartment D, keeps said apartment E continually freezing.

$c^3$, is a hole in the bottom of the ice cream pan, through which the frozen cream may be permitted to drop through a corresponding hole or door in the bottom of the box proper, into a receptacle for holding cream in large quantities. These openings or trap doors may be secured at will, by ordinary plugs, or air tight hinged doors.

$c^4$, is an opening through the shelf or partition A'', through which passes the conduit for the frozen cream.

E', is a pan secured in the front apartment, as a receptacle for cream when made in small quantities; said pan is provided with lifting rings $e$, which facilitate in moving said pan in and out of the drawer.

F, is a revolving cylinder, constructed of metal, and provided with wooden heads, with metallic inside and outside coverings; for furnishing more solid foundation for the insertion of the screws of the tripods $g$, and providing more steady revolution of the cylinder. A further and essential feature of these wooden heads is to provide a non-freezing rim on each side of the periphery of the cylinder, thereby avoiding waste, and allowing the corresponding small scrapers to prevent the cream from adhering to these parts of the cylinder.

F', is an opening in one end of the cylinder F, which is closed by a screw cap F'', and it is through this opening that the ice and salt are inserted into the cylinder.

$f$, are cups with openings in the same direction, extending across the surface and projecting about three inches toward the center, at right angles, for holding the ice and salt in permanent position. Said cups $f$, are provided with perforations $f''$ permitting of a circulation of water to the bottom of the cylinder, so that in its revolutions, the cups carry the ice around with it, while any water that may be in the cylinder, remains at the bottom where the freezing is greatest, and the cream comes in contact.

$f'''$, are the wooden cylinder heads, incased in the outer and inner metallic walls of said cylinder heads, to furnish greater solidity in securing the tripods and power shafts to the cylinder; and for the purpose of preventing the freezing of cream near the outer rims of the cylinder, where the brushes H are applied, for the removal of any unfrozen cream which may adhere to said rim.

G, is a gear wheel keyed to the power shaft G', which in turn is rigidly secured to the tripods $g$; said tripod $g$ is rigidly secured to the cylinder heads by screws $g'$. (See Fig. IV.)

G'', is a small gear operating loosely on the shaft, which is rigidly secured to the cover B, by means of plate, disk, or tripod $g^3$. This gear is provided with a crank or handle $g''$ by which power is furnished to the gear G'', and communicated to the gear G, which operates the drum.

H, are small brushes, about as wide as the thickness of the wooden cylinder heads, projecting inwardly from the rear wall of the refrigerator box, and coming in contact with the outer rims of the cylinders, near the point where said cylinder leaves the cream, and are for the purpose of removing the unfrozen cream from said rims.

Heretofore the opening in freezing cylinder, through which the ice and salt have been inserted, has been at the center of said cylinder, and has been constructed with a neck which formed the axis or bearing; thus leaving that part of the drum or cylinder exposed to the outer air. With our cylinder we provide a small axis or shaft $G^3$ for a bearing and have the opening to one side so that the cylinder is entirely within the box; no part of it being exposed to the outer air.

I, is a shallow concave pan, supported on walls $i$, which rest on the cleats A''. Said pan is to hold the liquid cream, which is introduced into same through the funnel J. (See Fig. III.)

The funnel J, is provided with a tube $j$, closed at its terminus by an automatic door $j'$, which opens and closes according to the pressure of the inflowing cream. The object of the automatic door, is to prevent the outside air from entering the freezer. The pan I, is provided with a small lifting ring $i'$, and in one end, a small slot $i''$, to receive the funnel tube $j$.

K, is the combined scraper and conduit for the frozen cream having a long side $k'$ and short side, $k$. The short side $k$, comes in contact with the cylinder F scraping all the frozen cream therefrom, and allowing it to pass through the said conduit, and drop into the ice cream pan E'; while the long side $k'$, acts as an apron to prevent the frozen cream, as it is removed from the cylinder being thrown against the outer walls of the freezer. The scraper and conduit are held firmly against the cylinder, by means of springs L or their equivalent which are bolted or otherwise rigidly secured to the inner walls of the freezer.

M, is a packing, fabric or plastic, between the outer and inner casings of the walls of the freezer.

$m$ are rubber strips secured entirely around the cover B, and on the under edge of same and are for the purpose of making the joint between said cover and the box entirely air tight when closed.

In the operation of our ice cream freezer, it will be seen that the cream will be poured into the funnel J, in the desired quantities, where it passes through the tube $j$ and automatic door $j'$ into the concave metallic pan I; whereby the turning of the handle by the operator, the cylinder F containing the ice and salt revolves toward the operator, and the frozen surface of said cylinder catches up the cream, carries it around until it comes in contact with the scraper $k$, where it is deposited into pan E', through conduit K; and when made in large quanties conduit K, may be extended through the opening $c^3$, and the frozen cream be deposited into large receptacle N.

Having thus fully described our invention, what we claim, and desire to secure by Letters Patent, is—

1. In an ice-cream freezer the combination substantially as described, of the cylinder F, the conduit K, formed with the upper extension K', and having its lower open end to project through an opening into the floor of the casing the ice-box D, having a receptacle E and the vessel E', arranged under the open end of the conduit K.

2. In an ice-cream freezer, the casing having an opening $c^3$ in the bottom, the ice-box D, having a hole in the floor thereof and provided with apartments E', having a hole in the floor thereof registering with the holes in the ice-box and casing, closures in the holes and the conduit K, substantially as and for the purposes specified.

In testimony whereof we have affixed our signatures in presence of two witnesses.

LYMAN C. MARTIN.
JAMES G. MEREDITH.

Witnesses:
BESSIE E. YOUNG,
KATIE SMITH.